(12) United States Patent
Holzapfel et al.

(10) Patent No.: US 8,173,305 B2
(45) Date of Patent: May 8, 2012

(54) FILM FORMER-FREE ELECTROLYTE/SEPARATOR SYSTEM AND USE THEREOF IN ELECTROCHEMICAL ENERGY ACCUMULATORS

(75) Inventors: Michael Holzapfel, München (DE); Petr Novák, Brugg (CH); Carsten Jost, Düsseldorf (DE); Anna Prodi-Schwab, Essen (DE); Volker Hennige, Dülmen (DE); Christian Hying, Rhede (DE)

(73) Assignee: Evonik Degussa GmbH, Essen (DE)

( * ) Notice: Subject to any disclaimer, the term of this patent is extended or adjusted under 35 U.S.C. 154(b) by 934 days.

(21) Appl. No.: 11/917,914

(22) PCT Filed: Apr. 27, 2006

(86) PCT No.: PCT/EP2006/061890
§ 371 (c)(1),
(2), (4) Date: May 2, 2008

(87) PCT Pub. No.: WO2006/136472
PCT Pub. Date: Dec. 28, 2006

(65) Prior Publication Data
US 2010/0183917 A1    Jul. 22, 2010

(30) Foreign Application Priority Data

Jun. 23, 2005    (DE) .................. 10 2005 029 124

(51) Int. Cl.
*H01M 6/16*  (2006.01)
*H01G 9/02*  (2006.01)

(52) U.S. Cl. ........ 429/328; 429/339; 429/326; 429/324; 252/62.2

(58) Field of Classification Search ................ 429/328, 429/339, 326, 324; 252/62.2
See application file for complete search history.

(56) References Cited

U.S. PATENT DOCUMENTS

| | | | |
|---|---|---|---|
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,620,320 B1 | 9/2003 | Hying et al. | |
| 6,841,075 B2 | 1/2005 | Penth et al. | |
| 7,351,494 B2 | 4/2008 | Hennige et al. | |
| 7,691,528 B2 * | 4/2010 | Hennige et al. | ............... 429/144 |
| 2002/0023419 A1 | 2/2002 | Penth et al. | |
| 2002/0039648 A1 | 4/2002 | Horpel et al. | |
| 2004/0028913 A1 | 2/2004 | Hennige et al. | |

(Continued)

FOREIGN PATENT DOCUMENTS

EP    1 244 168    9/2002

(Continued)

OTHER PUBLICATIONS

U.S. Appl. No. 12/388,671, filed Feb. 19, 2009, Hennige, et al.

(Continued)

*Primary Examiner* — Helen O Conley
(74) *Attorney, Agent, or Firm* — Oblon, Spivak, McClelland, Maier & Neustadt, L.L.P.

(57) ABSTRACT

The invention relates to an electrolyte separator system comprising an ionic liquid, a conductive salt and a ceramic separator, and the use of the electrolyte separator system according to the invention in electrochemical energy storage systems, in particular of lithium metal and lithium ion batteries.

19 Claims, 4 Drawing Sheets

U.S. PATENT DOCUMENTS

| | | |
|---|---|---|
| 2004/0038105 A1 | 2/2004 | Hennige et al. |
| 2004/0262169 A1 | 12/2004 | Hying et al. |
| 2005/0070193 A1 | 3/2005 | Hennige et al. |
| 2005/0084761 A1 | 4/2005 | Hennige et al. |
| 2005/0087491 A1 | 4/2005 | Hennige et al. |
| 2005/0221165 A1 | 10/2005 | Hennige et al. |
| 2005/0221192 A1 | 10/2005 | Hennige et al. |
| 2005/0255769 A1 | 11/2005 | Henninge et al. |
| 2006/0024569 A1 | 2/2006 | Hennige et al. |
| 2006/0046138 A1 | 3/2006 | Hennige et al. |
| 2006/0078791 A1 | 4/2006 | Hennige et al. |
| 2006/0166085 A1 | 7/2006 | Hennige et al. |
| 2007/0099072 A1 | 5/2007 | Hennige et al. |
| 2007/0139860 A1 | 6/2007 | Hoerpel et al. |
| 2007/0212615 A1 | 9/2007 | Jost et al. |
| 2008/0032197 A1 | 2/2008 | Horpel et al. |
| 2008/0138700 A1 | 6/2008 | Horpel et al. |
| 2008/0245735 A1 | 10/2008 | Hennige et al. |
| 2008/0248381 A1 | 10/2008 | Hennige et al. |

FOREIGN PATENT DOCUMENTS

| | | |
|---|---|---|
| EP | 1244168 A * | 9/2002 |
| JP | 2002 373704 | 12/2002 |
| WO | 01 93363 | 12/2001 |
| WO | WO01/93363 * | 12/2001 |
| WO | 2004 021499 | 3/2004 |

OTHER PUBLICATIONS

U.S. Appl. No. 12/670,483, filed Jan. 25, 2010, Pascaly, et al.

* cited by examiner

FILM FORMER-FREE ELECTROLYTE/SEPARATOR SYSTEM AND USE THEREOF IN ELECTROCHEMICAL ENERGY ACCUMULATORS

The invention relates to an electrolyte separator system and the use thereof in electrochemical energy storage systems.

Lithium ion batteries are electrochemical energy storage systems which have a very high energy density (up to 180 Wh/kg). These lithium ion batteries are used in particular in the area of portable electronics, such as, for example, in laptops, camcorders, hand-held devices or cell phones. Here, the negative electrode material comprises in particular graphitic carbon, conductive carbon black and a suitable binder material. This "graphite electrode" is used because of its stable cycle properties and its very safe handling compared with lithium metal (which is used in so-called "lithium metal batteries"), although graphitic carbon has a very low potential of from 100 to 200 mV against $Li/Li^+$. During charging of the lithium ion battery, lithium ions are incorporated into the graphitic carbon, the lithium ions being reduced here by taking up electrons. During discharging, this process is reversed. In general, lithium transition metal oxides, such as, for example, $LiCoO_2$, $LiNiO_2$ or $LiMn_xNi_yCo_{1-x-y}O_2$, which have a high potential of from 3.8 to 4.2 V against $Li/Li^+$, are used as positive electrode material.

The high energy density of the lithium ion batteries is the result of a large potential difference of the electrode combination, which may be up to 4 V. This large potential difference sets high requirements with regard to the electrolyte materials used; for example, a combination of a polar liquid with a lithium salt is used as the electrolyte, the lithium salt conducting the ions. Under the conditions prevailing in a lithium ion battery, as a rule electrolytes according to the prior art are not permanently stable since both the electrolyte liquid and the conductive lithium salt can be reduced at the negative electrode. The technical viability of the lithium ion batteries is due to the circumstance that, during the reduction at the negative electrode, an important constituent of conventional electrolytes, for example ethylene carbonate, forms a film which is insoluble in the electrolyte ("solid electrolyte interphase" or "SEI") on the surface of the graphite, this film permitting ion conduction but preventing a further reduction of the electrolyte. Ethylene carbonate, which is solid at room temperature, is generally used as a mixture with low-viscosity solvents, such as, for example, dimethyl carbonate (DMC) or ethyl methyl carbonate (EMC), in order to increase the conductivity. These low-viscosity additives make the electrolyte volatile at elevated temperatures and readily flammable. The mixture of film former and additives does not contribute to the electrochemical energy conversion but may account for a significant proportion of the mass of the electrolyte of a lithium ion battery. ("Primäre and wiederaufladbare Lithium-batterien" [Primary and rechargeable lithium batteries], Script for Inorganic Chemistry Technology Practical, TU Graz, February 2003, pages 9, 27.)

Blomgren et al. describe the use of ionic liquids as electrolyte materials in the lithium ion battery (A. Webber, G. E. Blomgren, Advances in Lithium-Ion Batteries (2002), 185-232; G. E. Blomgren, J. Power Sources 2003, 119-121, 326-329).

Covalent Associates describes, in WO 01/093363 a non-flammable electrolyte comprising a salt having an organic cation or an ionic liquid and an organic solvent, an acrylate or fluorine polymer and a conductive salt.

In JP 2002373704, Yuasa Corp. describes a nonaqueous electrolyte comprising imidazolium, a lithium salt and a cyclic ester having a π-bond.

Mitsubishi Chemicals Industries Ltd. describes, in JP 11307121, an electrolyte comprising an ionic liquid based on quaternary imidazolium or pyridinium ions and from 1 to 130% by volume of an organic cyclic compound.

Earlier attempts to prepare and to use electrolytes for lithium ion batteries based on ionic liquids have, however, been unsuccessful since electrolytes and electrodes decomposed, at the small potential difference at which incorporation of the lithium into the graphite takes place. Systems based on aluminum chloride (Carlin et al. in Journal of the Electrochemical Society 1994, 141, L21 and Koura et al. in Chemistry Letters 2001, 1320) were an exception but are complicated to prepare and to store and moreover are toxic owing to the $AlCl_3$ content. Furthermore, the deposition of lithium metal in some $AlCl_3$-free systems was observable but the stability of the deposited metal was not investigated (Fuller et al. in Journal of the Electrochemical Society 1997, 144, 3881). Only recently has it been possible to achieve partial lithium incorporation into carbon in $AlCl_3$-free systems, but with very poor yields and for not more than from 5 to 10 cycles (Katayama et al. Electrochemical and Solid State Letters 2003, 6, A96, Sakaebe et al. in $203^{rd}$ Meeting of the Electrochemical Society, Paris, 2003 and Sakaebe et al. in Electrochem. Commun. 2003, 5, 594). In two of these cases, N-methyl-propylpiperidiniumbis(trifluorsulfonyl)imide (PP13-TFSI) was used (Sakaebe et al. in $203^{rd}$ Meeting of the Electrochemical Society, Paris, 2003 and Sakaebe et al. in Electrochem. Commun. 2003, 5, 594), and in another case ethylene carbonate was mixed into n-hexyltrimethylammoniumbis(trifluorsulfonyl)imide (Katayama et al. in Electrochemical and Solid State Letters 2003, 6, A96). Also of interest is that lithium metal in PP13-TFSI and also in other quaternary ammonium salts appears to have a certain stability, as proven by cycle curves of an $Li/LiCoO_2$ cell (Sakaebe et al. in Electrochem. Commun. 2003, 5, 594). Lately, Howlett et al. were able to show that the highly reversible deposition of lithium on platinum in an electrolyte comprising a pyrrolidinium-based ionic liquid is possible (Howlett et al. in Electrochemical and Solid State Letters 2004, 7, A97).

It was therefore an object of the present invention to provide an electrolyte separator system which shows no electrochemical transformations in a lithium ion battery and subjects the electrodes to virtually no irreversible electrochemical changes during charging and discharging.

In the context of this invention, an electrolyte separator system is understood as meaning a combination of an electrolyte and a separator.

Figure 1A:
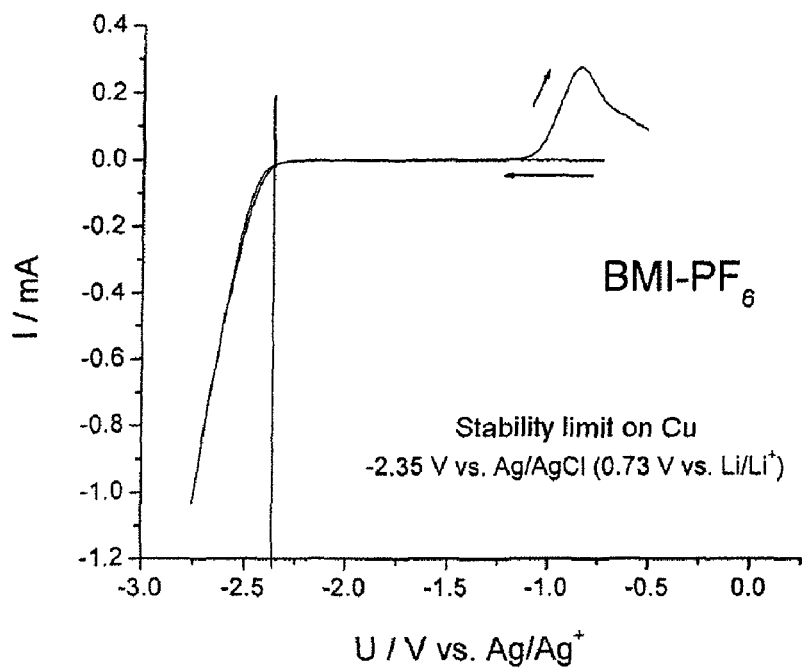
FIGS. 1a and 1b are graphs in which current I/mA (in mA) which flows between working electrode and opposite electrode is plotted against potential difference U/V (in volt) between working electrode and reference electrode for Example 2.

Surprisingly, it was found that an electrolyte separator system which has an electrolyte comprising A) a base component comprising A1) at least one ionic liquid which has a melting point of less than 100° C., based on the structure

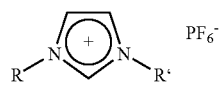

R and R', independently of one another, being alkyl radicals, being linear or branched, being saturated or unsaturated and being substituted or unsubstituted, and A2) from 0 to 70 ppm (m/m) of water, and B) from 0 to 10% by weight, based on the base component, of an additive, and C) a conductive salt, this conductive salt being present in the base component in an amount of from 0.25 mol/(l of base component) to the solubility limit, and has a ceramic separator makes the admixing of a film former superfluous, without the electrodes of the lithium ion battery being electrochemically attacked during the charging/discharging cycles.

An advantage of this invention is that the electrolyte wets the ceramic separator of the electrolyte separator system according to the invention significantly better than a conventional separator comprising polymeric material. Owing to the better wettability of the ceramic separator, the lithium ion battery assembled using the electrolyte separator system according to the invention can be filled with the electrolyte more rapidly. Moreover, the loadability with high charging and discharging currents is increased since the contact with the electrodes is improved. In contrast, separators comprising polymeric material are substantially noticeably impaired in their smoothness of the surface, the stiffness of the material and their color by the ionic liquid used according to the invention. The polymeric separator materials used according to the prior art are moreover only slightly resistant to ionic liquids and can be only poorly wetted by them, as is evident from example 1.b.

A further advantage of this invention is the increased safety to counteract overcharging or incorrect handling of the lithium ion battery equipped with the electrolyte separator system according to the invention in comparison with lithium ion batteries from the prior art, since the electrolyte separator system according to the invention contains no combustible or readily volatile constituents. Safe operation over a wider temperature range is therefore also possible.

The invention therefore relates to an electrolyte separator system, wherein the electrolyte separator system has an electrolyte comprising A) a base component comprising
A1) at least one ionic liquid which has a melting point of less than 100° C., based on the structure

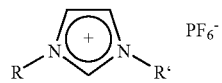

R, R', independently of one another, being alkyl radicals, linear or branched, saturated or unsaturated, substituted or unsubstituted, and
A2) from 0 to 70 ppm (m/m) of water, and
B) from 0 to 10% by weight, based on the base component, of an additive and C) a conductive salt, this conductive salt being present in the base component in an amount of from 0.25 mol/(l of base component) to the solubility limit,
and a ceramic separator.

The invention furthermore relates to the use of the electrolyte separator system according to the invention, wherein the electrolyte separator system has an electrolyte comprising A) a base component comprising
A1) at least one ionic liquid which has a melting point of less than 100° C., based on the structure

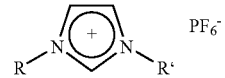

R, R', independently of one another, being alkyl radicals, linear or branched, saturated or unsaturated, substituted or unsubstituted, and
A2) from 0 to 70 ppm (m/m) of water, and
B) from 0 to 10% by weight, based on the base component, of an additive and
C) a conductive salt, this conductive salt being present in the base component in an amount of from 0.25 mol/(l of base component) to the solubility limit,
and a ceramic separator, in electrochemical energy storage systems.

The invention furthermore relates to a lithium ion battery which has an electrolyte separator system according to the invention.

In the context of this invention, ionic liquids are understood as meaning salts which have a melting point of not more than 100° C. An overview of ionic liquids is given, for example, by Welton (Chem. Rev. 99 (1999), 2071) and Wasserscheid et al. (Angew. Chem. 112 (2000), 3926).

Preferably, A1 of the electrolyte separator system according to the invention has a cation according to the structure 5a, R and R' being selected from alkyl groups which in particular have a number of carbon atoms from 1 to 12, preferably from 1 to 6. Particularly preferably, the ionic liquid of the electrolyte separator system according to the invention has a cation of the structure 5a, the substituents of the type R and R' being a methyl ($C_1$) and/or butyl group ($C_4$).

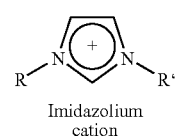

Imidazolium cation

The electrolyte separator system A2 according to the invention preferably has from 0 to 70 ppm (m/m) of water, particularly preferably not more than 20 ppm (m/m) of water.

Preferably, 1,2-dimethoxyethane, tetrahydrofuran, 2-methyltetrahydrofuran, diethylene glycol dialkyl ester, dioxolane, propylene oxide, dimethyl sulfoxide, dimethylformamide, formamide, nitromethane, gamma-butyrolactone, alkyl carboxylate, methyl lactate or a mixture of these compounds can be added as an additive to the electrolyte separator system according to the invention, it also being possible for a flame-proofing agent selected from chlorinated or brominated hydrocarbons, from halogenated or alkyl- or aryl-substituted phosphines, phosphates, phosphonates, phosphonites and phosphites to be added to the additive. In a preferred embodiment, the flameproofing agent contains no organic solvents or film formers. In a particularly preferred embodiment, the flameproofing agent is trimethyl phosphate.

The additive of the electrolyte separator system according to the invention may also contain a further ionic liquid. The additive of the electrolyte separator system according to the invention preferably contains ionic liquids which have organic cations. However, the additive of the electrolyte separator system according to the invention preferably contains ionic liquids which have a cation or a plurality of cations according to the following structures,

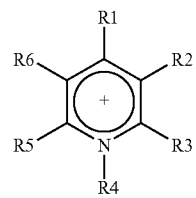
1

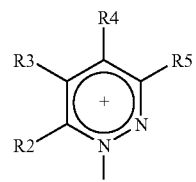
2

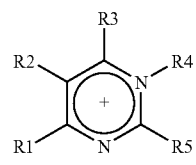
3

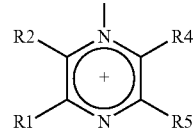
4

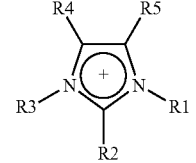
5

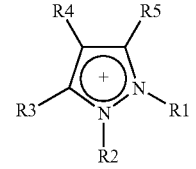
6

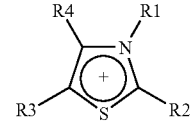
7

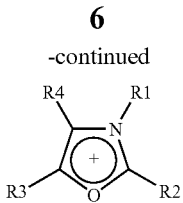
8

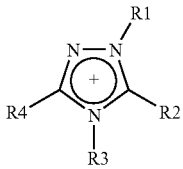
9

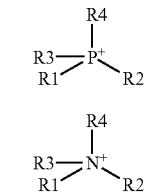
10

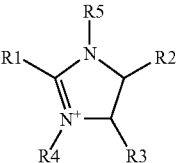
11

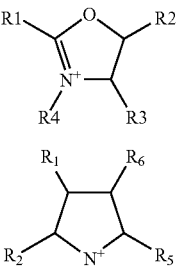
12

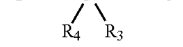
13

14 it being possible for R1, R2, R3, R4, R5 and R6 to be identical or different and to be hydrogen or a hydroxyl, alkoxy, sulfanyl (R—S—), $NH_2$—, NHR" or $NR"_2$ group, it being possible for R" to be an alkyl group having 1 to 8 carbon atoms, or halogen, in particular F, Cl, Br or I, a linear or branched aliphatic hydrocarbon radical having 1 to 20, preferably 1 to 8, preferably 1 to 4, carbon atoms, which may be substituted, for example by a hydroxyl group, alkyl group having 1 to 8, preferably 1 to 4, carbon atoms and/or halogen group, or unsubstituted, a cycloaliphatic hydrocarbon radical having 5 to 30, preferably 5 to 10, preferably 5 to 8, carbon atoms, which may be substituted, for example by a hydroxyl group, alkyl group having 1 to 8, preferably 1 to 4, carbon atoms and/or halogen group, or unsubstituted, an aromatic hydrocarbon radical having 6 to 30, preferably 6 to 12, preferably 6 to 10, carbon atoms, which may be substituted, for example by a hydroxyl group, an alkyl group having 1 to 8, preferably 1 to 4, carbon atoms and/or halogen group, or unsubstituted, an alkylaryl radical having 7 to 40, preferably 7 to 14, preferably 7 to 12, carbon atoms, which may be substituted, for example by a hydroxyl group, alkyl group having 1 to 8, preferably 1 to 4, carbon atoms and/or halogen group, or unsubstituted, a linear or branched aliphatic hydrocarbon radical interrupted by one or more heteroatoms (oxygen, NH, NCH$_3$) and having 2 to 20 carbon atoms, which may be substituted, for example by a hydroxyl group, alkyl group having 1 to 8, preferably 1 to 4, carbon atoms and/or halogen group, or unsubstituted, a linear or branched aliphatic hydrocarbon radical interrupted by one or more functionalities selected from the group consisting of —O—C(O)—, —(O)C—O—, —NH—C(O)—, —(O)C—NH, —(CH$_3$)N—C(O)—, —(O)C—N(CH$_3$)—, —S(O)$_2$—O—, —O—S(O)$_2$—, —S(O)$_2$—NH—, —NH—S(O)$_2$—, —S(O)$_2$—N(CH$_3$)—, —N(CH$_3$)—S(O)$_2$—, and having 2 to 20 carbon atoms, which may be substituted, for example by a hydroxyl group, alkyl group having 1 to 8, preferably 1 to 4, carbon atoms and/or halogen group, or unsubstituted, or a terminally —OH, —NH$_2$, —N(H)CH$_3$ functionalized linear or branched aliphatic hydrocarbon radical having 1 to 20 carbon atoms, which may be substituted, for example by a hydroxyl group, alkyl group having 1 to 8, preferably 1 to 4, carbon atoms and/or halogen group, or unsubstituted.

In this way, it is possible to obtain an electrolyte separator system according to the invention which contains no readily volatile components.

In general, the use of the additive in the electrolyte of the electrolyte separator system according to the invention is dependent on the ionic liquid used and serves for optimizing, preferably for reducing, the viscosity of the electrolyte of the electrolyte separator system according to the invention. The electrolyte of the electrolyte separator system according to the invention has, based on the base component, from 0 to 10% by weight, preferably from 0 to 5% by weight, of the additive.

The conductive salt C in the electrolyte separator system according to the invention is preferably a lithium compound selected from LiPF$_6$, LiClO$_4$, LiAsF$_6$, LiBF$_4$, LiCF$_3$SO$_3$, LiN(CF$_3$SO$_2$)$_2$, LiN(SO$_2$CF$_2$CF$_3$)$_2$, LiSbF$_6$, LiCl, LiNO$_3$, LiSCN, LiO$_3$SCF$_2$CF$_3$, LiC$_6$F$_5$SO$_3$, LiO$_2$CCF$_3$, LiFSO$_3$, LiB(C$_6$H$_5$)$_4$, LiB(C$_2$O$_4$)$_2$ and lithium fluoroalkylphosphate. In the electrolyte separator system according to the invention, the conductive salt is preferably present in an amount of from 0.25 mol/(l of base component) to the solubility limit of the conductive salt in the base component.

The electrolyte separator system according to the invention preferably has a ceramic separator which has a sheet-like, flexible substrate provided with a large number of orifices and having a porous inorganic coating present on and in this substrate, the material of the substrate being selected from woven or nonwoven, electrically nonconductive polymer or natural fibers and having a porosity of more than 50%. This substrate preferably has a porosity from 50 to 97%, particularly preferably from 75 to 90% and very particularly preferably from 80 to 90%. The porosity is defined here as the volume of the nonwoven (100%) minus the volume of the fibers of the nonwoven, i.e. the proportion of the volume of the nonwoven which is not filled by material. Here, the volume of the nonwoven can be calculated from the dimensions of the nonwoven. The volume of the fibers is obtained from the measured weight of the nonwoven considered and the density of the polymer fibers. The high porosity of the substrate also permits a higher porosity of the separator, and it is for this reason that higher absorption of electrolyte in the electrolyte separator system according to the invention can be achieved. The separator preferably has a thickness of less than 80 μm, preferably less than 75 μm, particularly preferably a thickness of from 10 to 75 μm and very particularly preferably a thickness of from 15 to 50 μm.

The substrate of the separator of the electrolyte separator system according to the invention preferably has a nonwoven having a thickness of from 1 to 200 μm, preferably from 5 to 50 μm and very particularly preferably from 10 to 30 μm. The thickness of the substrate has a great influence on the properties of the separator, first since not only the flexibility but also the sheet resistance of the electrolyte-impregnated separator is dependent on the thickness of the substrate. Moreover, thinner separators permit an increased packing density in a battery stack, so that a greater quantity of energy can be stored in the same volume. Furthermore, the limiting current density can also be increased thereby, by increasing the electrode area. The substrate of the separator preferably has a weight per unit area of from 1 to 50 g/m$^2$, preferably from 2 to 30 g/m$^2$ and particularly preferably from 4 to 15 g/m$^2$.

The separator of the electrolyte separator system according to the invention preferably has a poros, electrically insulating, ceramic coating. It may be advantageous if the coating present on and in the substrate has an electrically nonconductive oxide of the metals Al, Zr, and/or Si. Preferably, this separator has a porosity of from 10% to 80%, preferably from 20% to 70% and particularly preferably from 40% to 60%. The porosity is based on the reachable, i.e. open, pores. The porosity can be determined by means of the known mercury porosimetry method or can be calculated from the volume and the density of the starting materials used, if it is assumed that only open pores are present.

It may be advantageous if, in the electrolyte separator system according to the invention, the separators used have a tensile strength of at least 1 N/cm, preferably of at least 3 N/cm and very particularly preferably of more than 6 N/cm. The separators used can preferably be flexed without damage to any radius down to 100 mm, preferably down to 50 mm, particularly preferably down to 2 mm and very particularly preferably down to 0.1 mm The high tensile strength and the good flexibility of the separators used has the advantage that changes in the geometries of the electrodes which occur during charge and discharge of a battery can be followed by the separator without it being damaged. The flexibility furthermore has the advantage that commercially standardized wound cells can be produced using this separator. In the case of these cells, the electrode/separator layers are wound up with one another in a standardized size in the form of a spiral and contacted.

The electrolyte separator system according to the invention particularly preferably has ceramic separators which comprise a ceramic material applied to a substrate, such as, for example, a polymer nonwoven; such ceramic separators and their production are described, inter alia, in the following patent applications: WO 03/021697, WO 03/072231, WO 03/073534, WO 2004/021469, WO 2004/021474, WO 2004/021475, WO 2004/021476, WO 2004/021477 and WO 2004/021499. These documents, the content of which is to form the subject of the disclosure of the present invention, is hereby incorporated by reference.

The invention also relates to the use of the electrolyte separator system according to the invention for the production of electrochemical energy storage systems, in particular for the production of lithium metal or lithium ion batteries. The use of the electrolyte separator system according to the invention for the production of lithium ion batteries is preferred.

The lithium ion battery according to the invention is distinguished in that it has an electrolyte separator system according to the invention.

The following examples are intended to explain the electrolyte separator system according to the invention in more detail, without there being any intention to limit the invention to this embodiment. Below, 1-butyl-3-methylimidazolium hexafluorophosphate is abbreviated to $BMI-PF_6$ and 1-butyl-3-methylimidazolium to BMI. Water concentration of not more than 20 ppm (m/m) is to be understood below as meaning that the water concentration is less than the lower limit of detection of the measuring instrument used for the measurement thereof. A Karl-Fischer titrator with oven sample processor from Metrohm was used as the measuring instrument for the determination of the water concentration.

EXAMPLE 1.a

Wettability of the Ceramic Separator with the Ionic Liquid $BMI-PF_6$

A ceramic separator material, as described in example 1 of Patent Application WO 2004/021499, and the polymeric separator materials with the trade names ASAHI Polyolefin 6022 and Celgard® 2500 were cut into rectangular strips each having the same dimensions of 3 cm width and 1 cm length and were provided with a scale having millimeter graduations. Three strips of the ceramic separator material and one strip each of the polymeric separator materials were suspended perpendicularly so that they dipped into small Petri dishes which had been filled with $BMI-PF_6$, so that the respective separator material was in contact with the ionic liquid over the same area in each case. After various times, the height of rise of $BMI-PF_6$ on that surface of the separator material which was present above the liquid level of the ionic liquid was read with the aid of the scale graduation. The height of rise is a measure of the wettability of the separator material with the ionic liquid. The results of the readings are listed in table 1. SP1, SP2 and SP3, respectively, designate the three strips of the ceramic separator material, AS designates the polymeric separator material ASAHI Polyolefin 6022 and CE designates the polymeric separator material Celgard®2500.

TABLE 1

| Time in min | SP1 | SP2 | SP3 | CE | AS |
|---|---|---|---|---|---|
| | | Height of rise in cm | | | |
| 5 | 0.1 | 0.1 | 0.1 | 0 | 0 |
| 10 | 0.2 | 0.2 | 0.2 | 0 | 0 |
| 15 | 0.2 | 0.2 | 0.2 | 0 | 0 |
| 20 | 0.2 | 0.2 | 0.2 | 0 | 0 |
| 30 | 0.3 | 0.3 | 0.3 | 0 | 0 |
| 40 | 0.3 | 0.3 | 0.3 | 0 | 0 |
| 50 | 0.4 | 0.3 | 0.3 | 0 | 0 |
| 60 | 0.4 | 0.4 | 0.4 | 0 | 0 |
| 70 | 0.4 | 0.4 | 0.4 | 0 | 0 |
| 90 | 0.5 | 0.4 | 0.4 | 0 | 0 |
| 120 | 0.5 | 0.5 | 0.4 | 0 | 0 |
| 150 | 0.5 | 0.5 | 0.4 | 0 | 0 |
| 180 | 0.6 | 0.6 | 0.5 | 0 | 0 |
| 210 | 0.6 | 0.6 | 0.5 | 0 | 0 |
| 240 | * | 0.7 | 0.6 | 0 | 0 |
| 300 | * | * | 0.6 | 0 | 0 |
| 1440 | * | * | 1.4 | 0 | 0 |

* After this time, the height of rise was no longer measured.

The ceramic separator material was wet with $BMI-PF_6$ after only 5 min. On the other hand, the polymeric separator materials AS and CE were not wet with $BMI-PF_6$ even after 24 hours.

EXAMPLE 1.b

Testing of the Thermal Stability of the Ceramic Separator in the Ionic Liquid $BMI-PF_6$ The same separator materials as described in example 1.a were used. Three strips having the dimensions 1.5 cm×1.5 cm were cut from each separator material. Designations:
ceramic separator material: SP1, SP2, SP3;
polymeric separator material ASAHI Polyolefin 6022: AS 1, AS2, AS3;
polymeric separator material Celgard® 2500: CE1, CE2, CE3.

A strip of separator material was placed in a small glass tube which had a snap-on lid and had been filled with $BMI-PF_6$. The polymeric separator materials floated on the ionic liquid, the latter forming beads on the strip. $BMI-PF_6$ was therefore constantly sprinkled onto said strip during the further treatment.

All strips SP1 to SP3, AS1 to AS3 and CE1 to CE3 were heated in the ionic liquid by means of an oil bath and kept at the respective temperature for a defined time, in particular
SP3, AS3 and CE3 at 60° C. for a duration of 4 hours;
SP2, AS2 and CE2 at 60° C. for a duration of 4 hours, then at 80° C. for a further 2 hours;
SP1, AS1 and CE1 at 60° C. for a duration of 4 hours, then at 80° C. for a further 2 hours, then at 100° C. for a further 2 hours.

After the respective heat bath, the strips were removed, freed from $BMI-PF_6$ by sprinkling with ethanol and dried in air.

The condition of the samples was evaluated with the naked eye and under a magnifying glass on a light table. Testing was carried out with regard to shrinkage of the separator material, which, if present, was observable in the form of curling and warping at the edges, with regard to formation of wavy deformations on the surface of the separator material, with regard to changes in the transparency and the material color, and with regard to abrasion by means of fingers. The results are summarized in table 2.

TABLE 2

| | Time in hours [in oil bath with temperature in ° C.] | | |
|---|---|---|---|
| Sample | 4 [60] | 4 [60] + 2 [80] | 4 [60] + 2 [80] + 2 [100] |
| SP3 | normal | | |
| AS3 | slight incipient shrinkage | | |
| CE3 | deformed edge | | |
| SP2 | | normal | |
| AS2 | | incipient shrinkage | |
| CE2 | | wavy surface | |
| SP1 | | | normal |
| AS1 | | | shrinkage |
| CE1 | | | wavy surface, transparent spots at one corner | normal = equivalent to: surface unchanged, no shrinkage, no optical change, no abrasion After only 4 hours at 60° C., the polymeric separator materials exhibited shrinkage or deformation at the edge of the respective strip. The higher the temperature and the longer the residence times in the oil bath, the greater the shrinkage of ASAHI Polyolefin 6022. In the case of Celgard® 2500, a wavy surface and transparent spots at a corner of the strip were found. On the other hand, the ceramic separator material remained unchanged during the entire time and at all set temperatures.

BMI-PF$_6$ showed no optically detectable changes in color or viscosity during the entire test sequence.

EXAMPLE 2

Determination of the Electrochemical Window of BMI

In order to determine the stability of the electrolyte of the electrolyte separator system according to the invention with respect to electrochemical processes, the electrochemical window is determined. In this context, the potential difference applied to a suitable electrode pair which dips into the electrolyte of the electrolyte separator system according to the invention is increased or decreased. As soon as the applied potential difference exceeds or falls below a certain value, the electrolyte of the electrolyte separator system according to the invention exhibits a current flow, and electrochemical decomposition takes place. The values found after a suitable increase or decrease in the potential differences define the electrochemical window. Within the electrochemical window, the electrolyte of the electrolyte separator system according to the invention exhibits no current flow, i.e. is electrochemically stable.

Figure 1B:
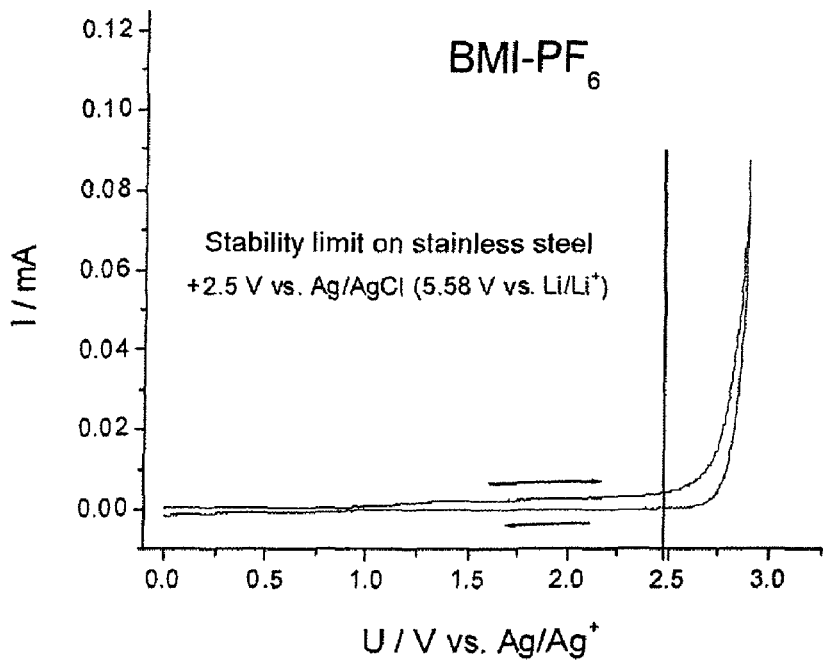

The determination of the electrochemical window of the electrolyte of the electrolyte separator system according to the invention was carried out in a glass cell under argon without addition of an additive. The voltage sweep rate chosen was 5 mV/s. The reference electrode used was an AgCl-coated Ag rod, which had a potential of −3.08 V against Li/Li$^+$. The measurement was effected cathodically on copper (cf. FIG. 1a) or anodically on stainless steel (cf. FIG. 1b). In FIGS. 1a and 1b, the current I/mA (in mA) which flows between working electrode and opposite electrode is plotted against the potential difference U/V (in volt) between working electrode and reference electrode.

BMI having a water concentration of not more than 20 ppm (m/m) together with LiPF$_6$ in a concentration of 1 mol/(l of base component) as conductive salt was used as the electrolyte of the electrolyte separator system according to the invention.

It was found that BMI has an electrochemical window between −2.35 V cathodically against copper and +2.5 V anodically against stainless steel. Before reaching the Li/Li$^+$ potential, BMI is cathodically, i.e. reductively, decomposed.

The peak at a current of about −0.7 V on the curve in FIG. 1a is attributable to the oxidation of the substances which are formed by the reduction of BMI, which occurs at potentials above 2 V against Li/Li$^+$. These substances may be identical to those present in the protective layer on the negative electrode. In a lithium ion battery, the potential difference at the graphite of the negative electrode always remains below 1.5 V against Li/Li$^+$ so that a conversion effected by reduction and oxidation at the graphite surface cannot occur.

EXAMPLE 3

Testing of the Lithium Incorporation with BMI-PF$_6$

In this experiment, BMI-PF$_6$ having a water concentration of not more than 20 ppm (m/m) was used with 1 mol/(l of base component) LiPF$_6$ as electrolyte of the electrolyte separator system according to the invention. This was used in a half-cell arrangement which was subjected to electrochemical cycling.

By means of a half-cell arrangement, the behavior of the electrolyte of the electrolyte separator system according to the invention and the reversible or irreversible incorporation of lithium ions into the electrode materials, the so-called lithiation, are investigated in a sandwich arrangement comprising (negative) working electrode, electrolyte separator system according to the invention and (positive) opposite/reference electrode, as a function of the potential difference between working electrode and opposite/reference electrode. The working electrode used is an electrode with an electrode material comprising 90% by weight of graphite with the trade name SFG44 from TIMCAL SA, Switzerland, and 10% by weight of polyvinylidene fluoride (PVdF) binder. The opposite/reference electrode is a partly lithiated Li$_4$Ti$_5$O$_{12}$ spinel, to which BMI-PF$_6$ is stable. The opposite/reference electrode has a potential of 1.56 V against Li/Li$^+$. The limits of the potential differences are set at 0 and −1.55 V, which corresponds to 10 mV and 1.56 V, respectively, against Li/Li$^+$ potential.

The quotient of the charge transported with the lithiation into the mass of the electrode material and of the active mass of the electrode material is designated below with capacitance and is stated in units of the theoretical nominal capacitance C of the graphite material, which is 372 mAh/g. The quotient of capacitance and time is designated as cycle rate. The value used in this experiment for the cycle rate is 10 mA/(g of graphite) for the first cycle and 50 mA/(g of graphite) for the subsequent cycles. The charging and discharging are effected on reaching the limit of the potential difference with a current decrease to below a value which corresponds to 5 mA/(g of graphite) (in this context, cf. H. Buqa et al. in ITE Battery Letters, 4 (2003), 38).

Figure 2A:
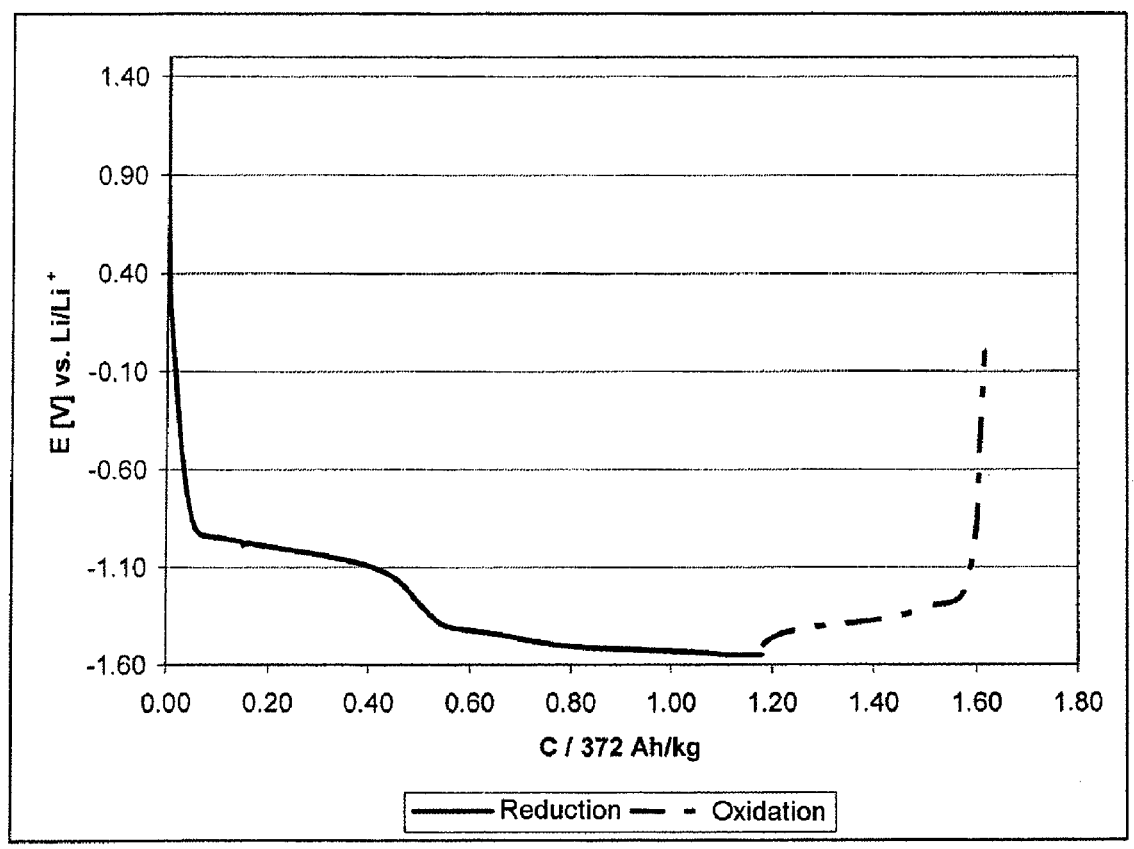
FIG. 2a is a graph in which potential difference E (in volt) based on $Li/Li^+$ potential between a working electrode and an opposite/reference electrode is plotted against capacitance in units of C for Example 3.

In FIG. 2a, the potential difference E (in volt) based on the Li/Li$^+$ potential between working electrode and opposite/reference electrode is plotted against the capacitance in units of C. It was found that lithium was reversibly incorporated into the mass of the electrode material, only the first cycle which is composed of "oxidation" and "reduction" being shown in this type of diagram in FIG. 2a. The capacitance was above 372 Ah/kg, which would be established on complete lithiation.

Figure 2B:
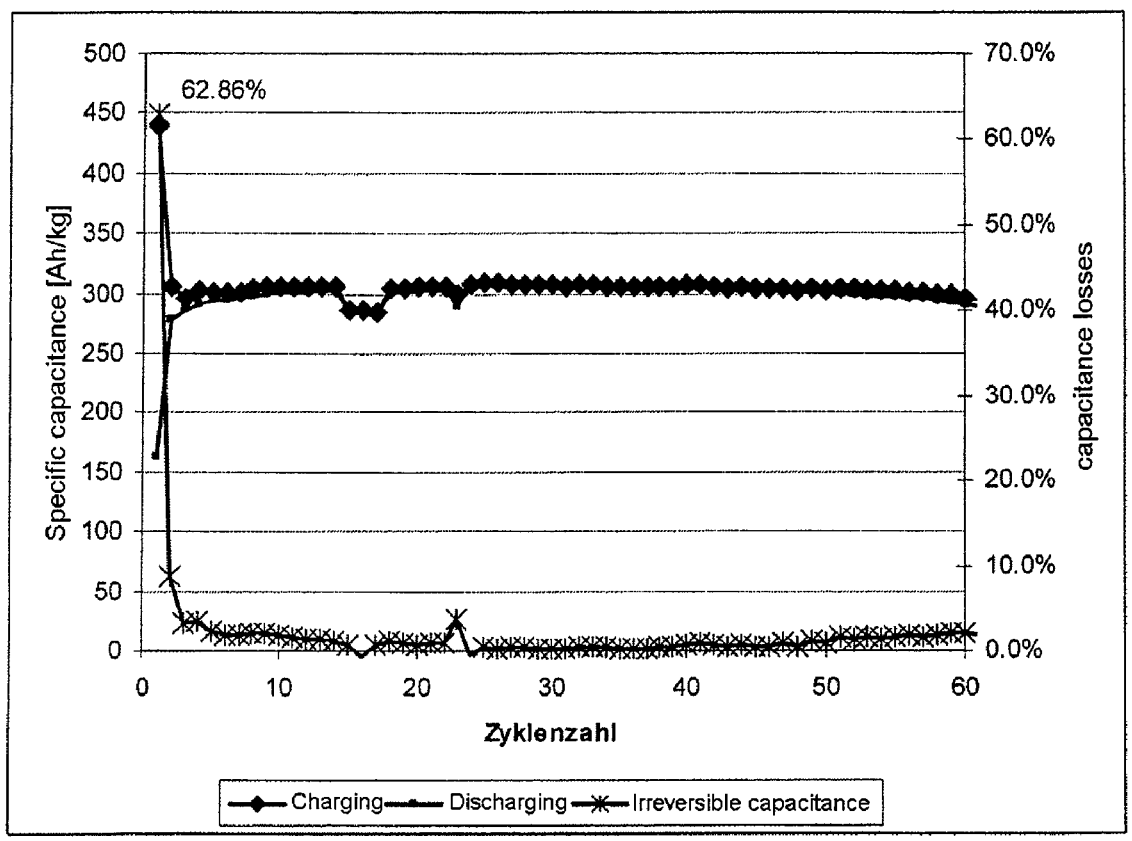
FIG. 2b is a graph in which specific capacitance and capacitance losses is plotted against zyklenzahl (number of cycles) for Example 3.

FIG. 2b shows that the lithium incorporation and elimination are repeatable over at least 40 cycles without loss of reversible capacitance, the reversible capacitance increasing and, up to the 10th cycle, the irreversible losses declining to values of from 1% to 2%.

COMPARATIVE EXAMPLE 1

Testing of the Lithium Incorporation with the Ionic Liquid 1-ethyl-3-methylimidazoliumbis(trifluorosulfonyl)imide (Abbreviated to EMI-TFSI)

The experiment on lithium incorporation was carried out analagously to example 3. The electrolyte used was a composition comprising EMI-TFSI and the conductive salt lithium bis(trifluorosulfonyl)imide, abbreviated to LiTFSI, in a concentration of 0.5 mol/(l of base component).

Figure 3:
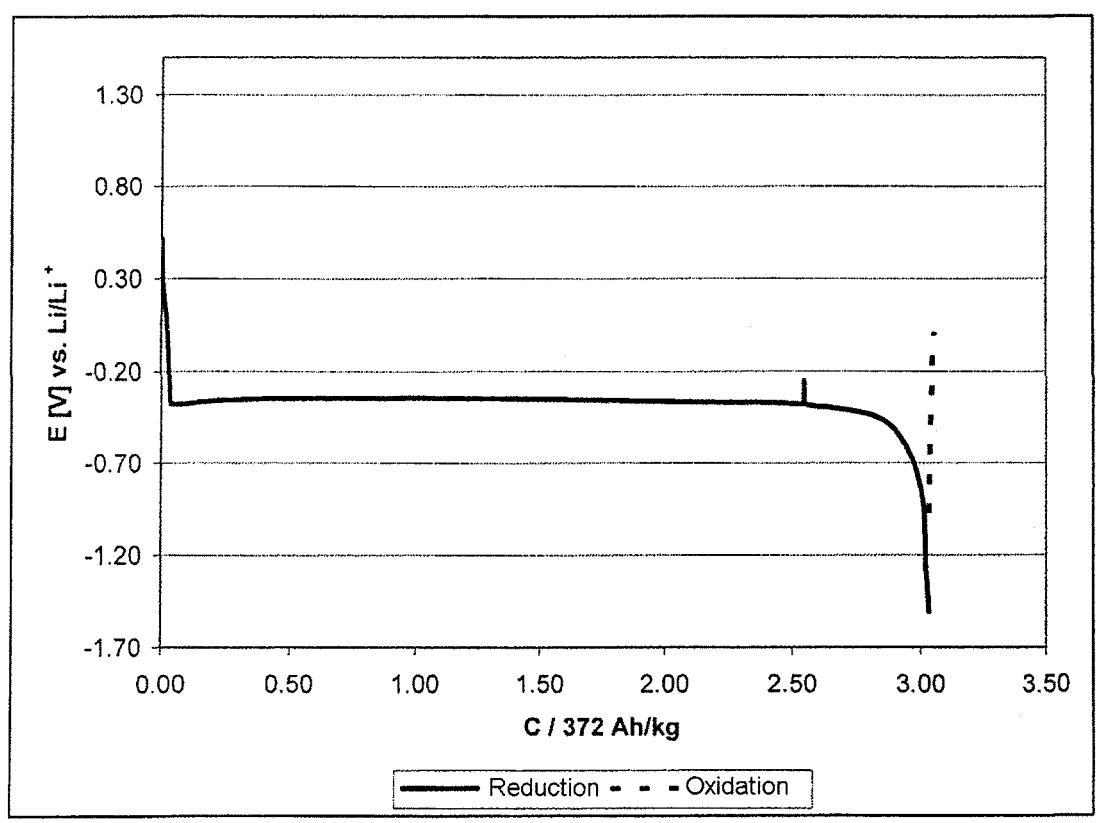
FIG. 3 is a graph in which potential difference E (in volt) based on $Li/Li^+$ potential between a working electrode and an opposite/reference electrode is plotted against capacitance in units of C for Comparative Example 1.

As in example 3, cycling was carried out once, and the same negative electrode as in example 3 was used. From FIG. 3, it is evident that no lithium incorporation into the electrode material was possible. In the case of potential differences from −0.3 V to −0.4 V, corresponding to potential differences of from 1.1 to 1.2 V in a measurement against Li/Li$^+$, decomposition of the ionic liquid takes place by reduction.

The invention claimed is:

1. An electrolyte separator system, wherein the electrolyte separator system has an electrolyte comprising
A) a base component comprising
A1) at least one ionic liquid which has a melting point of less than 100° C., based on the structure

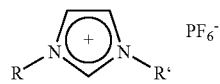

R, R', independently of one another, being alkyl radicals, linear or branched, saturated or unsaturated, substituted or unsubstituted, and
A2) from 0 to 70 ppm (m/m) of water, and
B) from 0 to 10% by weight, based on the base component, of an additive and
C) a conductive salt, this conductive salt being present in the base component in an amount of from 0.25 mol/(1 of base component) to the solubility limit,
and a ceramic separator.

2. An electrolyte separator system as claimed in claim 1, wherein R and R' are $C_1$ to $C_{12}$.

3. An electrolyte separator system as claimed in claim 1, wherein the additive is present and is selected from 1,2-dimethoxyethane, tetrahydrofuran, 2-methyltetrahydrofuran, diethylene glycol dialkyl ester, dioxolane, propylene oxide, dimethyl sulfoxide, dimethylformamide, formamide, nitromethane, gamma-butyrolactone, alkyl carboxylate, methyl lactate or a mixture of these compounds.

4. An electrolyte separator system as claimed in claim 1, wherein the additive is present and is a flameproofing agent selected from chlorinated, brominated hydrocarbons, halogenated, alkyl- or aryl-substituted phosphines, phosphates, phosphonates, phosphonites, phosphites or a mixture of these compounds.

5. An electrolyte separator system as claimed in claim 1, wherein the additive is present and contains a further ionic liquid based on at least one of the following structures:

1
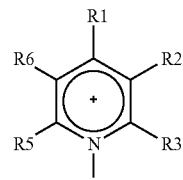

2
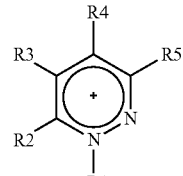

3
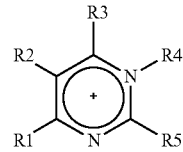

4
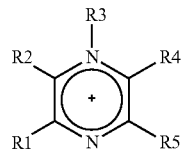

5
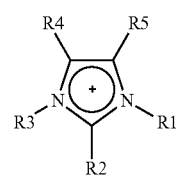

6
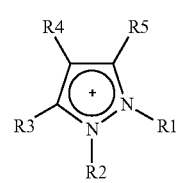

7
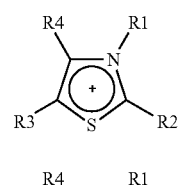

8
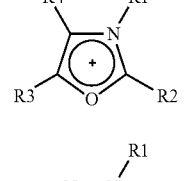

9
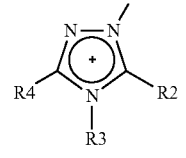

10
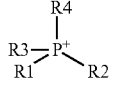

11
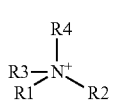

12
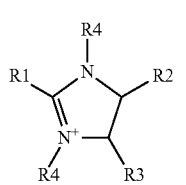

13
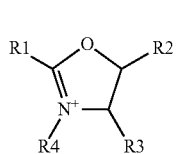

-continued (14)

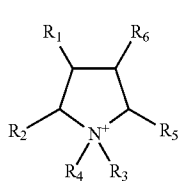

wherein R₁, R₂, R₃, R₄, R₅ and R₆ are identical or different and are:
- (1) hydrogen, hydroxyl, alkoxy, sulfanyl (R—S—), NH₂—, NHR" or NR"₂ group, wherein R" is an alkyl group having 1 to 8 carbon atoms, or halogen, or
- (2) a linear or branched aliphatic hydrocarbon radical having 1 to 20 carbon atoms, which may be substituted by at least one of a hydroxyl group, alkyl group having 1 to 8, and halogen group, or unsubstituted, or
- (3) a cycloaliphatic hydrocarbon radical having 5 to 30 carbon atoms, which may be substituted by at least one of a hydroxyl group, alkyl group having 1 to 8, and halogen group, or unsubstituted, or
- (4) an aromatic hydrocarbon radical having 6 to 30 carbon atoms, which may be substituted by at least one of a hydroxyl group, an alkyl group having 1 to 8 carbon atoms and halogen group, or unsubstituted, or
- (5) an alkylaryl radical having 7 to 40 carbon atoms, which may be substituted by at least one of a hydroxyl group, alkyl group having 1 to 8 carbon atoms and halogen group, or unsubstituted, or
- (6) a linear or branched aliphatic hydrocarbon radical interrupted by one or more heteroatoms (oxygen, NH, NCH₃) and having 2 to 20 carbon atoms, which may be substituted by at least one of a hydroxyl group, alkyl group having 1 to 8 carbon atoms and halogen group, or unsubstituted, or
- (7) a linear or branched aliphatic hydrocarbon radical interrupted by one or more functionalities selected from the group consisting of —O—C(O)—, —(O)C—O—, —NH—C(O)—, —(O)C—NH, —(CH₃)N—C(O)—, —(O)C—N(CH₃)—, —O—S(O)₇—, —S(O), —NH—, —NH—S(O)₂—, —S(O)₂—N(CH₃)—, —N(CH₃)—S(O)₂—, and having 2 to 20 carbon atoms, which may be substituted by at least one of a hydroxyl group, alkyl group having 1 to 8 carbon atoms and halogen group, or unsubstituted, or
- (8) a terminally —OH, —NH₂, —N(H)CH₃ functionalized linear or branched aliphatic hydrocarbon radical having 1 to 20 carbon atoms, which may be substituted by at least one of a hydroxyl group, alkyl group having 1 to 8 carbon atoms and halogen group, or unsubstituted.

6. An electrolyte separator system as claimed in claim 1, wherein the conductive salt is selected from LiPF₆, LiClO₄, LiAsF₆, LiBF₄, LiCF₃SO₃, LiN(CF₃SO₂)₂, LiN(SO₂CF₂CF₃)₂, LiSbF₆, LiCl, LiNO₃, LiSCN, LiO₃SCF₂CF₃, LiC₆F₅SO₃, LiO₂CCF₃, LiFSO₃, LiB(C₆H₅)₄, LiB(C₂O₄)₂ and lithium fluoroalkylphosphate.

7. An electrolyte separator system as claimed in claim 1, wherein the ceramic separator has a sheet-like, flexible substrate provided with a large number of orifices and having a porous inorganic coating present on and in this substrate, the material of the substrate being selected from woven or non-woven, electrically nonconductive polymer or natural fibers and having a porosity of more than 50%.

8. A method for producing an electrochemical energy storage system comprising incorporating the electrolyte separator system as claimed in claim 1 therein.

9. The method of using as claimed in claim 8, wherein the electrochemical energy storage system is a lithium metal or lithium ion battery.

10. A lithium ion battery which has an electrolyte separator system as claimed in claim 1.

11. An electrolyte separator system as claimed in claim 1, wherein R and R' are C₁ to C₆.

12. An electrolyte separator system as claimed in claim 1, comprising A2) from 0 to 20 ppm (m/m) of water.

13. An electrolyte separator system as claimed in claim 7, wherein the substrate has a porosity of from 75 to 90%.

14. An electrolyte separator system as claimed in claim 1, wherein the separator has a thickness of less than 80 μm.

15. An electrolyte separator system as claimed in claim 7, wherein the substrate has a weight per unit area of from 1 to 50 g/m².

16. An electrolyte separator system as claimed in claim 7, wherein the porous inorganic coating comprises an electrically nonconductive oxide of the metals Al, Zr and/or Si.

17. An electrolyte separator system as claimed in claim 7, wherein the separator has a porosity of from 10 to 80%.

18. An electrolyte separator system as claimed in claim 1, wherein the separator has a tensile strength of at least 1 N/cm.

19. An electrolyte separator system as claimed in claim 1, wherein the component A1 comprises at least 1-butyl-3-methyl-imidazolium hexafluorophosphate as the ionic liquid.

* * * * *